May 26, 1931. H. A. JEWETT 1,806,804
LIQUID LEVEL INDICATOR AND STOP
Filed Aug. 15, 1928
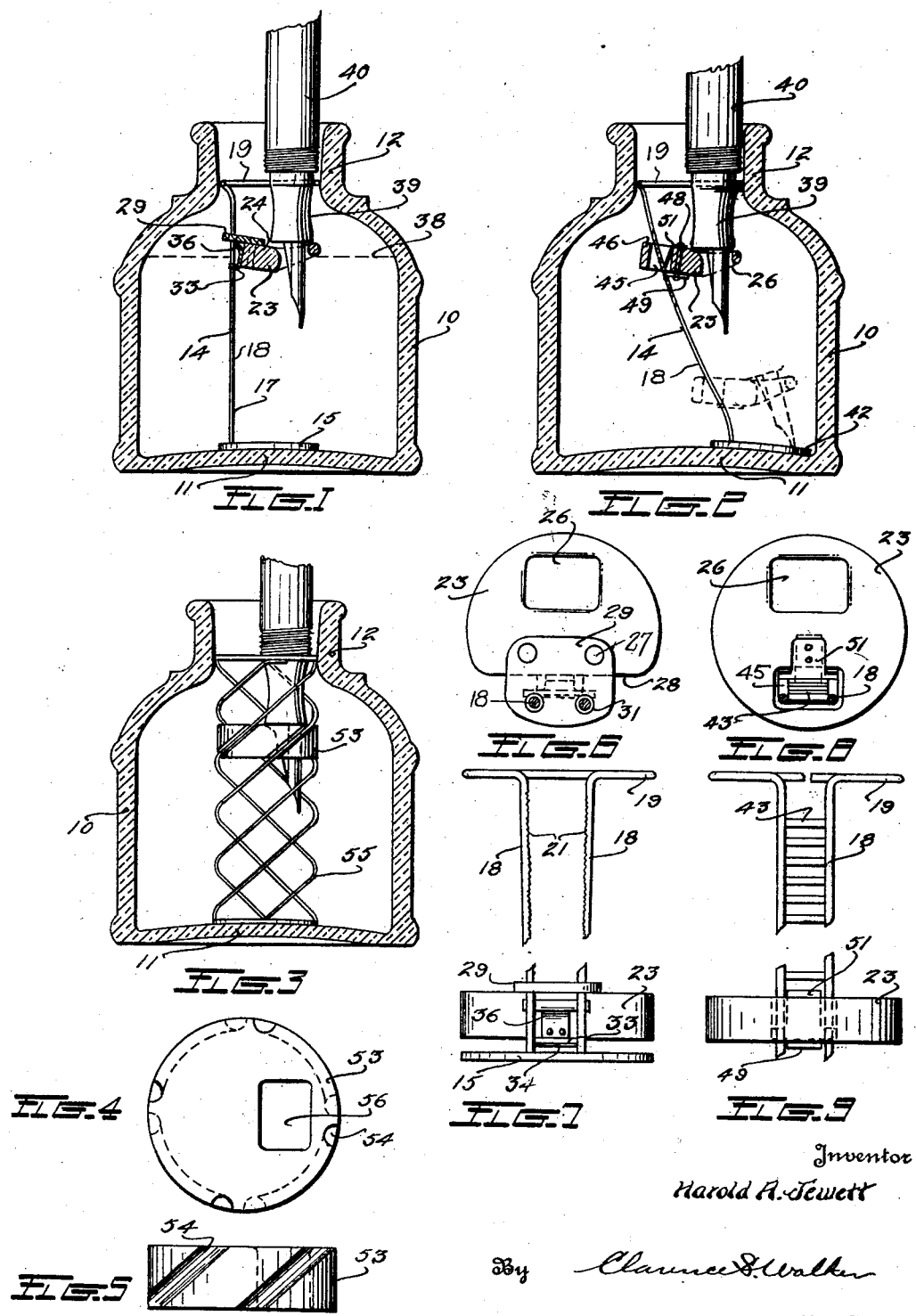
Inventor
Harold A. Jewett
By Clarence D. Walker
His Attorney Patented May 26, 1931

1,806,804

UNITED STATES PATENT OFFICE

HAROLD A. JEWETT, OF FREDONIA, NEW YORK

LIQUID LEVEL INDICATOR AND STOP

Application filed August 15, 1928. Serial No. 299,802.

This invention relates to an improvement in ink stands or ink bottles and more particularly to the method and means for filling pens therefrom.

In its preferred embodiment this invention contemplates the provision of a liquid level indicator having an automatic stop forming a part thereof which permits the dipping of pens into the bottle only a sufficient distance to receive ink upon the point thereof but not upon the barrel or grip portion of the pen.

It is a well known fact that much of the ink used at the present time is sold in small or medium sized bottles. The task of filling a fountain pen or dipping a pen of the quill type into the ink without having the barrel or grip portion thereof become covered with ink is very difficult. Unquestionably it is almost impossible to accurately determine the height of a column of ink within a bottle and to place a pen within the neck of a bottle, to a sufficient depth to immerse only the point, is extremely difficult. The usual results are that the pen either does not receive ink upon the point or else it is immersed to the extent where the point strikes the bottom of the bottle and when withdrawn there is the constant necessity of cleaning off the grip portion after every dipping or filling.

The principal object of this invention is the provision of a liquid level indicator and stop for use in connection with ink wells by which a pen is permitted to be immersed within the ink only to the extent that the point thereof is covered by the liquid.

Another object of this invention is the provision of a liquid level indicator and stop for use in conjunction with ink wells which automatically indicates the height of the column of ink and at the same time guards against a too great immersion of the pen in the ink.

A further object of this invention is the provision of a device of this class for use in connection with filling or dipping pens which may be removed from a well or bottle when the ink supply is diminished and transferred to another bottle for similar use.

Other and further objects of this invention will appear from a consideration of the following specification taken in connection with the accompanying drawings, and in which Fig. 1 is a vertical sectional view of an ink well fitted with one modification of this invention and shows the arrangement by which a pen is prevented from too complete immersion in the ink;

Fig. 2 is a view similar to Fig. 1, showing a slight modification of the structure by which the entrance of the pen into the ink is controlled;

Fig. 3 is a vertical sectional view showing a further modification of the principle disclosed in Figs. 1 and 2;

Fig. 4 is a plan view of the float shown in the embodiment in Fig. 3;

Fig. 5 is a side elevation of the float shown in Fig. 4;

Fig. 6 is a plan view of the float device shown in Fig. 1;

Fig. 7 is a rear elevation of the supporting structure and float used in the modification of Fig. 1;

Fig. 8 is a plan view of the float structure shown in Fig. 2; and

Fig. 9 is a rear elevation of the device shown in Figs. 2 and 8.

Referring to the drawings and particularly to Fig. 1 thereof, this invention is shown within an ink bottle or well designated the reference numeral 10. The bottle 10 is of usual construction being provided with a curved base 11 and small neck 12. Within the bottle 10, supported upon the base 11 and by means of the neck 12, is a liquid level indicator and stop 14. The indicator 14 comprises a base 15, which is curved to conform to the contour of the base 11 and which, because of its close engagement with said base, will remain in position due to the adhesive tendency of the ink between the base 15 and the base of the well 11. Extending upwardly from the base 15 is a support 17. The support is comprised of two guide wires 18 formed from a continuous wire, the free ends of which are secured in the base 15, the closed end 19 being curved to conform to the inner diameter of the neck of the bottle. The faces of the guides 18 which are opposite each other, are provided with serrations 21, the purpose of which will later be set forth.

A float 23 is adapted to be mounted upon and guided by the support 17. The float is comprised of a body portion 24 formed from wood, cork, or any other buoyant material and is provided with a vertical opening 26 adjacent one edge thereof. The float 23, being of a thickness to insure buoyancy, is tapered off from its lower edge to a reduced thickness about the opening 26. Secured to the upper face of the float 23, in any suitable manner as by pins or rivets 27, and extending beyond the straight vertical wall 28 thereof, is a plate 29. This plate is provided with openings 31 therethrough, the diameter of which are approximately twice that of the guides 18. Beneath the plate 29 and secured to the wall 28 of the float 23 is a combined stop plate 33 and spring 36. This plate is concentrically mounted with relation to the plate 29 and extends outwardly at right angles to the vertical wall 28 of the float to a position approximately in line with the inner edge of the openings 31. The projecting end of the stop plate 33 is provided with rounded corners which converge into a knife like edge 34. Attention is called to the fact that the width of the plate 33 is slightly greater than the space between the guides 18 with which it is to contact and the knife edge 34 is adapted to engage the serrations 21 located upon the inner vertical faces of the guides. The other end of the plate 33 terminates in a T shaped spring 36. Both plate and spring are secured to the wall 28 in any suitable manner as by pins. The head of the spring is flared outwardly in such a manner that it projects slightly beyond a vertical line drawn from the projecting edge of the plate 33.

When it is desired to mount the indicator 14, it is necessary to engage the float 23, by means of the openings 31 in the plate 29, with the guide wires 18. The base 15 of the indicator may now be secured to the guides in any suitable manner as by welding and the entire device inserted into the neck of a bottle. Attention is called to the fact that the diameter of the closed end 19 of the support 17 is slightly greater than the inner diameter of the neck of the bottle and because of this the guide wires 18, as may be seen in Fig. 7, are not parallel. However, when the indicator 14 is inserted into the bottle, the closed end 19 is slightly compressed and the spring tension thereof prevents it from becoming dislodged from its position of use as shown in Fig. 1. By slightly compressing the closed end 19 to insert it into the neck of the bottle the guide wires 18 are forced to parallel each other thus permitting a free upward and downward movement of the float 23 upon said guides. Because of the large diameter of the openings 31 in the plate 29, as the liquid is poured into the bottle, the float will rise and remain at the surface thereof being guided in its upward travel by the guides 18. Assuming now that the liquid within the bottle is at the height indicated by the dotted line 38, it will be noted that the buoyancy of the float is such that it is only partially submerged within the liquid. When a fountain or any other type of pen is inserted into the neck of the bottle the point thereof will find the opening 26 in the float, passing therethrough into the liquid to a point where the shoulder above said point abuts the upper face of the float. As soon as the shoulder 39 of the pen 40 engages the float, said float is tipped to the position shown in Fig. 1. The tipping is accomplished through the action of the plate 33 coming in contact with the serrated edges 21 of the guide 18 to form a fulcrum about which the float tends to pivot. The tipping action is of necessity limited to the clearance of the guides 18 within the openings 31 of the plate 29 and as soon as the guides strike the outer edge of the openings in the plate, the float is locked in position. It may be seen that the shoulder 39 of the pen is still well above the level of the liquid and yet at the same time the point of the pen is completely immersed. Upon lifting the pen from the bottle, the float instantly rights itself due to the action of the spring 36 which, when said float was tilted, was placed under tension against the edges of the guide 18. In the event that a considerable quantity of liquid has been removed from the bottle, the float will not level itself without the aid of the spring 36 since it is above the level of the liquid. However, as soon as the spring action causes the stop plate 33 to disengage itself from the serrations 21 of the guides 18, the float 23 will instantly drop to the level of the liquid and the device is again ready for use as occasion requires.

Attention is called to the fact that the reduced thickness of the wall about the opening 26 through which the point of the pen passes is provided to insure the filling opening in the pen point free contact with the ink. Attention is further directed to the curved upper wall of the opening 26 by means of which entrance thereto may be readily had.

The modification shown in Fig. 2 of the drawings, while based upon the same principle as that shown and described in Figs. 1, 6, and 7, is slightly altered to provide for the complete emptying of a bottle of ink. In this embodiment the base 42 of the indicator 14 is adapted to rest upon the base of the bottle 11 adjacent the vertical wall thereof. The guide wires 18 are formed in a manner substantially identical to that shown in Fig. 1, terminating at their open ends in the base 42 and forming a continuous loop at their upper end to fit the neck of the bottle. However, in this instance the guides 18 are provided with cross members 43 welded or otherwise suitably secured between the guides 18 (see Fig. 9). The members 43 are spaced an equal distance from each other and take the place of the serrations 21 shown in Fig. 7. The float 23, in so far as the opening and support for the pen is concerned, is identical with the float previously described, however, on the side remote from the opening 26 a second opening 45 is provided. This opening is adapted to permit the guide wires 18 passage therethrough and the shoulder 46 of the opening acts in a manner similar to the plate 29 when the float is depressed by a pen. Secured to the under face of the float in any suitable manner as by a rivet or pin 48 is a plate 49, the end of which projects beyond the edge of the opening 45. This plate is of a width slightly less than the width of the space between the guide wires 18 and is used for a purpose about to be described. The rivet or pin 48 is the means by which a spring 51 is secured to the upper face of the float. The spring 51, being bent to extend downwardly into the opening 45, is so located that the outer edge thereof projects into said opening a slight distance beyond the edge of the plate 49. The manner of assembling the structure shown in this modification is identical with that previously described and will not therefore be further discussed.

When it is desired to operate a device as shown in this modification, the pen is inserted into the opening 26 of the float which is at the level of the liquid and as the shoulder 39 of the pen strikes the rim of the opening 26 that portion of the float is depressed causing the plate 49 to enter the space between two adjacent cross members 43. The contact of the plate 49 upon one of the cross members 43 acts as a fulcrum about which the float tends to pivot to a point where it is stopped by the shoulder 46. It may be seen that the float is locked in position and that as soon as the pen is removed from the well, the action of the spring 51 will cause the float to right itself, disengaging the plate 49 from the members 43 and allowing said float to drop to the slightly lowered level of the liquid.

A further modification of this invention is shown in Figs. 3, 4, and 5 of the drawings, and in this instance a plurality of spiral wires joined in any convenient manner to each other are provided. A float 53 having depressions 54 therein is provided, the angle at which the depressions are created corresponding to the angle or pitch of the spiral wire frame 55. The float is provided with a pen opening 56 and when in position within the spiral frame 55 is adapted to rotate it upwardly or downwardly according to the change in the level of the liquid. When the pen is inserted into the bottle or well and the pressure of the shoulder thereof depresses the float, said float will not rotate downwardly but will tend to slightly wedge itself thus preventing the shoulder of the pen from being immersed in the liquid. Even though there should be a tendency for the float 53 to rotate downwardly due to the pressure of the pen this is impossible because of the fact that the opening 56 therethrough is rectangular and of only a sufficient size to permit a loose engagement of the pen point. The grip the operator has upon the barrel of the pen prevents the float from turning and moving downwardly into the liquid whereby to submerge the shoulder of the barrel.

It is quite obvious that many other modifications of this invention other than those above described may be made without departing from the spirit and scope of the invention and applicant does not intend to be limited thereto in the scope of his invention other than as set forth in the following claims.

I claim:

1. A liquid level indicator and stop for filling pens from ink wells comprising a plate seated upon the base of said well, a guide secured to and extending upwardly from said plate, a loop terminating the upper end of said guide adapted to support said indicator within the neck of said well, a floatable member mounted for vertical reciprocation upon said guide, walls defining a pen opening in said floatable member, said opening being remote from said guide and locking means formed upon said floatable member adapted to prevent the downward travel thereof upon said guide when pressure is applied adjacent said pen opening.

2. A liquid level indicator and stop for filling pens from ink wells comprising a supporting member mounted within said well and in engagement with the base and neck thereof, a floatable member, means engaging said floatable member with said support, a plate secured to the upper face of said floatable member and overhanging one vertical wall thereof, said supporting member being in engagement with said plate through an opening permitting vertical reciprocation of said floatable member, and a spring plate secured to said floatable member and adapted to engage said support to prevent any downward movement of said floatable member when a slight pressure is applied thereto.

3. A liquid level indicator and stop for filling pens from ink wells comprising a plate seated upon the base of said well, a guide secured to and extending upwardly from said plate, a loop terminating the upper end of said guide adapted to support said indicator within the neck of said well, a floatable member mounted for vertical reciprocation upon said guide, a pen opening in said floatable member, said opening being remote from said guide, a plate having openings therethrough secured to and extending beyond the vertical edge of said floatable member, said guide being in engagement with said plate through said opening and locking means formed upon said floatable member adapted to prevent the downward travel thereof upon said guide when pressure is applied adjacent said pen opening.

4. In a liquid level indicator and stop for filling pens from ink wells comprising a supporting member mounted within said well, a floatable member in engagement with said supporting member, a spring and plate secured to said floatable member, said spring acting to prevent the engagement of said plate with said supporting member other than when a downward pressure is applied to said floatable member.

5. In a liquid level indicator and stop for filling pens from ink wells comprising a supporting member mounted within said well, a floatable member in engagement with said supporting member, a plate secured to said floatable member and extending beyond the vertical edge thereof, said plate having an opening therethrough adapted to support said floatable member upon said supporting member, a spring secured to said floatable member, and normally adapted to prevent said plate from engaging said supporting member whereby said float might be locked at the level of the liquid within said well.

6. A liquid level indicator and stop for filling pens from ink wells comprising a base mounted on the bottom of said well, a guide secured to and extending upwardly from said base, said guide terminating in an integral horizontally disposed portion engaging the neck of said well, a floatable member mounted for vertical reciprocation on said guide, a plate secured to said floatable member and in engagement with said guide, and means adapted to prevent vertical movement of said plate and said float upon said guide when said float is manually depressed.

7. A liquid level indicator and stop for filling pens from ink wells comprising a supporting member mounted within said well and in engagement with the base and neck thereof, a floatable member, a plate secured to said floatable member, said plate being mounted for vertical reciprocation upon said support, a spring secured to said float and adapted to normally prevent said float from moving into locked engagement with said support.

In testimony whereof I have affixed my signature.

HAROLD A. JEWETT.